United States Patent Office 3,684,518
Patented Aug. 15, 1972

3,684,518
AQUEOUS SUSPENSION RUMINANT FEED
COMPOSITION
Joseph S. Wortham, Morris County, N.J., assignor to
Allied Chemical Corporation, New York, N.Y.
No Drawing. Filed Jan. 19, 1970, Ser. No. 4,137
Int. Cl. A23k 1/02, 1/22
U.S. Cl. 99—2 N                                      1 Claim

ABSTRACT OF THE DISCLOSURE

Aqueous suspension ruminant feed supplements resistant to sedimentation and formation of large crystals and solid aggregates are formulated to comprise a water-soluble polyphosphate and a colloidal dispersion of starch granules. The ratio of the weight of the polyphosphate (expressed as $P_2O_5$) to the weight of the starch is preferably between about 0.2 and about 2 and the sum of the weight of the polyphosphate (expressed as $P_2O_5$) and the weight of the starch constitutes preferably between about 2% and about 10% of the total weight of the composition.

BACKGROUND OF THE INVENTION

This invention relates to ruminant feed supplements in fluid suspension form. More particularly, it relates to the incorporation of water-soluble polyphosphates and colloidal dispersions of starch granules into aqueous suspension ruminant feed supplements to inhibit formation of large crystals and the settling of solids therein.

Fluid suspension ruminant feed supplements are generally aqueous suspensions of ruminant-nourishing compounds of phosphorus, nitrogen, magnesium, calcium, and sulfur. In general, the aqueous suspension ruminant feed supplements contain 3 to 5 of the above kinds of nutrients as well as sodium chloride and minor amounts of other beneficial additives.

The production and use of aqueous suspension ruminant feed supplement is becoming an increasingly attractive alternative to dry feed supplements. Suspension feed supplements have several advantages over dry supplements. For example, aqueous suspension feed supplements can be formulated to contain up to about 75% by weight ruminant food without sacrificing the operational advantages of simple liquid. A further advantage of suspension feed supplements is the relative ease by which the compositions thereof can be varied. Moreover, a suspension feed supplement can be readily sprayed onto a dry basal feed ration to overcome the inherent difficulty of achieving uniform distribution by dry-mixing procedures.

Heretofore, fluid suspension ruminant feed supplements have suffered the disadvantage of being relatively unstable. That is, they tended to undergo rapid fall-out or settling of solid constituents (hereinafter referred to as "sedimentation") and formation of large crystals and solid aggregates. Such properties impair, inter alia, the flow rates and viscosity values of the suspensions. It is known to inhibit such sedimentation and formation of large crystals and solid aggregates by preparing suspension ruminant feed supplements in the presence of substantial amounts of molasses-like suspension stabilizers. Unfortunately, such prior art suspension stabilizers are only effective for short periods of time; suspension feed supplements containing such stabilizers are generally unfit for use if allowed to stand undisturbed for more than a few days. Moreover, the addition of some ingredients appears to result in reactions within the molasses which are either chemical or enzymatic. Because of this incompatibility, some ingredients of potential benefit must be omitted. For example, when molasses-containing feed suspensions are mixed with phosphoric acid or ammonium salts thereof, an irreversible gel is formed almost immediately or within a relatively short time. Further, supplements should have a stable life of several weeks and molasses-based supplements tend to form rigid gels or separate upon storage depending on storage conditions.

SUMMARY OF THE INVENTION

It is an object of the present invention to provide an aqueous suspension ruminant feed supplement which is resistant to sedimentation.

Another object of the invention is to provide an aqueous suspension ruminant feed supplement which is resistant to the formation of large crystals and solid aggregates.

Another object of the invention is to provide a method for producing an aqueous suspension ruminant feed supplement which is resistant to sedimentation.

Yet another object is to provide a method for producing an aqueous suspension ruminant feed supplement which is resistant to the formation of large crystals and solid aggregates therein.

According to the present invention, sedimentation and formation of large crystals and solid aggregates in an aqueous suspension of conventional ruminant feed supplements (e.g., ruminant-nourishing compounds of nitrogen, phosphorus, calcium, magnesium and sulfur) are effectively inhibited by incorporating into the composition a water-soluble polyphosphate and a colloidal dispersion of starch granules in amounts such that the ratio of the weight of the polyphosphate (expressed as $P_2O_5$) to the weight of starch is between about 0.1 and about 5, and preferably between about 0.2 and about 2.0. Also, the amounts of polyphosphate and starch used are such that the sum of the weight of the polyphosphate (expressed as $P_2O_5$) and the weight of the starch constitutes between about 0.5% and about 12% of the weight of the aqueous ruminant feed composition, and preferably between about 2% and about 10% thereof.

It is a feature of this invention that the polyphosphate content of the novel suspension ruminant feed composition is exclusive of other phosphorus compounds, e.g., orthophosphate salts and the like, which can also be present.

PREFERRED EMBODIMENT OF THE INVENTION

An especially preferred aqueous suspension ruminant feed supplement according to the present invention has a weight ratio of polyphosphate ($P_2O_5$) to starch of between about 0.25 and about 1.0. The sum of the weight of the polyphosphate ($P_2O_5$) and the weight of the starch in such especially preferred composition constitutes between about 4% and about 9% of the weight of the total composition.

Water-soluble polyphosphates and starch suitable for use in the present invention are not toxic to ruminants. Moreover, such components are ruminant-nourishing.

Preferred polyphosphates suitable for use in this invention are the ammoniated polyphosphoric acids, which are preferably (but not necessarily) employed in commercially available form, e.g., "Poly-N," which is an aqueous ammoniated wet-process superphosphoric acid. This material can be obtained by evaporating aqueous wet-process phosphoric acid so as to form wet-process superphosphoric acid which is then ammoniated in the presence of water to give aqueous ammoniated wet-process superphosphoric acid.

The aqueous ammoniated superphosphoric acid of this invention has a pH of from about 5 to 8, preferably about 6; a nitrogen content of from about 9% to 12% by weight, preferably from about 10% to 11% by weight; a total phosphorus content measured as $P_2O_5$ of from about 28% to 39% by weight, preferably about 34% to 38% by weight, and wherein polymeric phosphates represent from about 30% to 70% by weight, preferably from about 55% to 65% by weight, based on the weight of the total phosphorus content. The polymeric phosphates include pyrophosphates and other polyphosphates.

An aqueous ammoniated superphosphoric acid having the following properties which will hereinafter be referred to as "Solution A," was found to be useful for purposes of the present invention:

Nitrogen—10% by weight
Phosphorus [1] (as $P_2O_5$)—34% by weight
Trace minerals—1 to 2% by weight
    Iron ($Fe_2O_3$)—ca. 1.0% by weight
    Calcium (CaO)—ca. 0.1% by weight
    Magnesium (MgO)—ca. 0.3% by weight
pH—6.0
Specific gravity at 60° F.—1.4
Salting out temperature—0° F.

[1] Distribution as percent by weight of the ammonium phosphates present was about:

| | Percent |
|---|---|
| Ammonium orthophosphate | 37 |
| Ammonium pyrophosphate | 49 |
| Ammonium tripolyphosphate | 8 |
| Ammonium tetrapolyphosphate | 5 |
| Higher ammonium phosphates | 1 |

The starches employed in the practice of this invention are derived from a wide variety of plant sources such as potatoes, corn, wheat, rice and others. Preferred sources of starch are the products of milling of cereal grains and include by way of example, wheat flour, middlings, red dog and residue.

While starches are not soluble in cold water, a swelling of starches occurs when they are heated with water and the starches assume a gelatinized condition suitable for use in the present invention. In accordance with a preferred embodiment of the invention the starch is agitated in aqueous urea solution to produce a thixotropic gel, fluid at the temperature of preparation but forming a semisolid on cooling. Such gelatinized starch is essentially a colloidal dispersion of starch granules.

Small amounts of molasses-like suspension promoters can be advantageously employed conjointly with the use of a polyphosphate and starch. However, the presence of small amounts of molasses in the suspension feed supplements of this invention, albeit desirable, is by no means essential. When it is desired to include the use of molasses-like suspension promoters in formulating the aqueous suspension feed compositions of the present invention, it is preferred that such molasses-like materals be used in amounts between about 5% by weight and about 30% by weight of the total composition. Additional substances, which are beneficial to ruminants and whose use is conventional in the art, may be incorporated into the novel suspension ruminant feed supplements of the present invention. Such substances include, for example, antibiotics, diethylstilbestrol, various vitamins, and compounds of zinc, iron, cobalt, copper, manganese and magnesium. The use of such additives, while advantageous, is nevertheless regarded as ancillary feature of the present invention.

In preparing the novel suspension ruminant feed supplements of the present invention, the order of mixing the ingredients is not critical; the advantages of the present invention are realized using any mixing procedure which achieves a uniform suspension in a gelatinized starch matrix containing polyphosphate in the desired ratio. However, for manipulative convenience, it is preferred to combine the constituents in the following order: water, starch, nitrogen-containing compounds (desirably urea). Agitation is required because starch is not effective as a suspending agent until the particles thereof are broken down. If it is desired to include molasses-like suspension promoters, it is preferably done at this stage. After the above-mentioned components are blended, a water-soluble polyphosphate is added and blended into the mixture. Finally, calcium carbonate and other conventional ruminant nutrients and the like which are desired to be suspended are added to the system. Alternatively, the calcium carbonate and other materials to be suspended can be added prior to the addition of the polyphosphate. The aqueous suspension of the present invention can be formulated at ambient temperature or slightly thereabove with conventional agitation. Ambient temperatures are herein defined to mean temperatures substantially below the boiling point of water, and preferably between about 40° C. and about 70° C.

The novel aqueous suspension ruminant feed supplements of the present invention are two-phase (solid-liquid) compositions which can be produced and stored for at least two weeks without any significant sedimentation or growth of large crystals and solid aggregates (i.e., crystals and aggregates large enough to cause clogging of pipelines and spraying equipment). This period of stability enjoyed by the fluid suspensions of the present invention permits the utilization thereof without the need for constant agitation or redispersion of the suspended particles between the time the suspensions are formulated and the time of their application. Without wishing to be bound by theory, it is believed that the advantages of the present invention are achieved by virtue of a combination of the suspending power of the colloidal dispersion of starch granules and the sequestering action of the polyphosphates on the iron and various other trace mineral components. Moreover, soluble magnesium compounds react with pyrophosphates to produce magnesium pyrophosphates in the form of needle-shaped crystals which act as a random lattice or matrix within the fluid suspension, somewhat analogous to a haystack. This lattice entraps the suspended particles and retards the rate of fall-out thereof, and also promotes the formation of small crystals.

In the following examples, parts and percentages are by weight unless otherwise indicated.

For convenience in formulating the suspension ruminant feed supplements described in the examples, the urea is derived from a 68.8% aqueous urea solution which is readily available at a lower cost than prilled or crystalline urea. It is not intended, however, to limit the source of urea to this material. The polyphosphate is derived from "Solution A," an aqueous ammoniated superphosphoric acid, described in detail hereinabove. Solution A contains 34% phosphate measured as $P_2O_5$ of which about 63% is present as polyphosphates, chiefly ammonium pyrophosphate.

The stability of the fluid suspension ruminant feed supplements prepared in the examples is measured by filling a cylinder to a known volume with suspension and allowing the cylinder to stand undisturbed for 2 weeks at about 25° C. At the end of this time, the volume of clear liquid on top of the suspension is determined and subtracted from the total volume of the suspension to give the volume of suspended solids. The volume of suspended solids divided by the total volume multiplied by 100 gives the percent apparent solids. The relation between the quality (i.e., stability) of a given fluid suspension of the present invention and the percent apparent solids is as follows:

100%—excellent
95–99%—very good
90–94%—good
Less than 90%—unsatisfactory

EXAMPLE 1

A fluid suspension ruminant feed supplement was prepared having the following composition:

| Ingredient: | Pounds per 1000 pounds of product |
|---|---|
| Water | 460.25 |
| Corn starch | 30.00 |
| Urea liquor (68.8 wt. percent urea) | 220.00 |
| Solution A | 67.15 |
| Ammonium sulfate | 15.00 |
| Trace mineral mix | 2.00 |
| Sodium chloride | 100.00 |
| Ca-Mg carbonates (powdered form) | 105.00 |
| Diethylstilbestrol solution | 0.25 |
| Vitamin mix | 0.35 |

The 0.5 ton batch was prepared as follows: About 150 pounds of water at about 40° C. was placed in a mixing tank and 30 pounds of corn starch was added with vigorous stirring. After a smooth, lump-free mix was obtained, 150 pounds additional water at about 40° C. was added and mixed. Then, 220 pounds of 68.8% urea liquor at 65° C. was added, and sufficient steam was added in about 6 minutes to raise the temperature of the mixture to 68° C. to facilitate break up of the starch into a colloidal dispersion of starch granules. The temperature of the mixture was held at 68° C. for 10 minutes, and then the remaining water and other ingredients were added in the order listed. The mixture was stored and allowed to cool to room temperature (about 25° C.). Brookfield viscosity of the final mixture was 250 centipoises, and the fluid suspension had a stability rating of "good." The supplement could be sprayed onto a basal ruminant feed without difficulty using conventional equipment for dispensing liquid feed supplements.

EXAMPLE 2

A fluid suspension ruminant feed supplement was prepared having the following composition:

| Ingredients: | Pounds per 1000 pounds of product |
|---|---|
| Water | 450.25 |
| Wheat flour (second clear hard grade) | 40.00 |
| Urea liquor (68.8 wt. percent urea) | 220.00 |
| Solution A | 67.15 |
| Ammonium sulfate | 15.00 |
| Trace mineral mix | 2.00 |
| Sodium chloride | 100.00 |
| Ca-Mg carbonates (powdered form) | 105.00 |
| Diethylstilbestrol solution | 0.25 |
| Vitamin mix | 0.35 |

The 0.5 ton batch was prepared as follows: About 200 pounds of water was placed in a mixing tank and heated to 43° C. Next, 40 pounds of flour was added with vigorous stirring. After a smooth, lump-free mix was obtained, 220 pounds of 68.8% aqueous urea liquor at 65° C. was added and sufficient steam was added to raise the temperature to 68° C. The temperature was held at 68° C. for 5 minutes and the remaining water and other ingredients were added as in Example 1. The mixture was stored and allowed to cool to room temperature. Brookfield viscosity of the final mixture was 450 centipoises. The fluid suspension had a stability rating of "excellent." This product could be sprayed onto solid ruminant feeds without difficulty using conventional equipment for dispensing liquid feed supplements.

EXAMPLE 3

In this example a flour-based product was formulated containing formaldehyde to further stabilize the starch-polyphosphate matrix.

Composition

| Ingredients: | Quantity, grams |
|---|---|
| Flour (wheat) | 50 |
| Water | 1100 |
| 37% formaldehyde (inhibited) | 25 |
| Urea (65% solution at 70° C.) | 413 |
| Solution A | 182 |
| Salt | 200 |
| Ammonium sulfate | 30 |

First, 1000 grams of water was heated to 70° C. and the flour was blended in. The mixture was stirred for 30 minutes at 70° C. Twenty-five grams of 37 percent (inhibited) formaldehyde was added with continued stirring. Mixing was continued for 30 minutes. In sequence 413 grams of 65 percent urea solution, 182 grams of Solution A, 200 grams of sodium chloride, and 30 grams of ammonium sulfate were added with stirring. After 30 minutes additional stirring, 100 grams of water was added to bring the total weight to 2000 grams.

In storage tests, the product remained fluid and free of gel formation and separation for six months. The effect of temperature on viscosity of the liquid feed supplement was determined as indicated in the following table:

| Temperature, ° C.: | Viscosity, centipoises |
|---|---|
| 25 | 60 |
| 20 | 65 |
| 15 | 95 |
| 10 | 110 |
| 5 | 125 |
| 0 | 180 |
| −5 | 220 |
| −10 | 250 |
| −15 | 500 |

EXAMPLE 4

The formulation of Example 3 was fed to a mature wether lamb as a supplement to a basal ration consisting of 585 grams of prairie hay pellets, 30 grams of soybean oil meal, and 100 grams of corn. The supplement was sprayed onto the basal ration at from 20 to 100 grams per day. Animal intake was excellent at all supplementation levels, e.g., at the highest level of intake, the animal emptied the feeder within 15 minutes. This demonstrates that the supplement is palatable to the animal.

EXAMPLE 5

The formulation of Example 3 was further tested as a ruminant feed supplement by observing in vitro growth response of rumen microorganisms as follows:

About 500 ml. of rumen fluid was removed from a fistulated steer fed a high roughage ration. The fluid was strained through a double thickness of gauze to remove large feed particles and was incubated in a container at 39° C. for one hour. The fluid as removed from the bottom of the container contained ruminal microorganisms.

As a control, an optimum growth mixture was used consisting of 0.5 ml. of a urea solution containing 100 mg. urea/ml., 1.0 ml. glucose solution containing 60 mg. glucose/ml. 3.5 ml. buffer solution (artificial saliva), and 5.0 ml. rumen fluid. In the test sample, 0.5 ml. of the ruminant feed supplement was substituted for the urea solution.

The mixtures were incubated in test tubes at 39° C. for 24 hours, and deoxyribonucleic acid (DNA) was determined. The control sample contained 0.394 mg. DNA/ml., and the ruminant feed supplement sample contained 0.447 mg. DNA/ml. This shows that the ruminant feed supplement improved the performance of rumen microorganism over that observed in an optimum growth medium.

EXAMPLE 6

This example demonstrates that relatively small amounts of molasses may be incorporated in the starch-polyphosphate feed supplement to increase viscosity without any adverse gelling effects. The following ingredients were employed:

| Ingredients: | Parts by weight |
|---|---|
| Water | 252.0 |
| Wheat flour | 20.0 |
| Molasses | 62.0 |
| Solution A | 33.6 |
| Urea | 73.5 |
| Ammonium sulfate | 7.5 |
| Ammonium carbonate | 1.9 |
| Sodium chloride | 50.0 |
| | 500.5 |

About 73.5 parts of urea and 1.9 parts of ammonium carbonate were dissolved in 37.5 parts of water at 65° C., and 33.6 parts of Solution A was added with stirring. In a separate vessel, 20 parts of wheat flour was stirred into 50 parts of water until a homogeneous paste free of lumps was produced. The hot urea liquor was added to the flour paste with continuous stirring. No additional heat other than that provided by the hot urea liquor was needed to form a colloidal dispersion of starch granules. After mixing for 5 minutes, 62 parts of 60–90 Brix molasses was stirred into the mixture. Finally, 7.5 parts of ammonium sulfate and 50 parts of sodium chloride were added in 164 parts of water, and the mixture was stirred until homogeneous. The final product contained 4% wheat flour and 12.4% molasses based on the total weight of the composition. Viscosity was 2,600 centipoises and the mix was free of settling or of gell formation for more than two weeks.

This test and similar tests showed that the addition of molasses, preferably 5–30% molasses, increases markedly the viscosity and suspending power of the product mixture. This occurs while avoiding any of the characteristic problems of rigid gel formation usually associated with molasses.

EXAMPLE 7

Example 6 was repeated except that three products were made with the following differences: one product contained 10% molasses based on the total weight of the composition with no starch added; the second product contained 2% starch with no molasses added; and the third product contained 10% molasses and 2% starch. Weight of each product was adjusted to 500 parts by adjustment of the water content of the mixture. The product containing 10% molasses with no starch had a viscosity of about 8 centipoises; the product containing 2% starch and no molasses had a viscosity of about 26 centipoises; however, the product containing 10% molasses and 2% starch had a viscosity of 600 centipoises. This example shows that there is a synergistic increase in viscosity associated with the addition of about 10% molasses to a starch-polyphosphate mixture. This synergistic effect was less evident at higher molasses concentrations, but was evident at molasses concentrations of about 5–30% by weight.

I claim:

1. A method of producing an aqueous suspension ruminant feed composition which contains solid ruminant nutrients in suspension and is resistant to sedimentation and formation of large crystals, comprising admixing water at a temperature no greater than about ambient temperature with a ruminant nutrient selected from the group consisting of urea, ammonium orthophosphate, magnesium carbonate, calcium carbonate and ammonium sulfate; a water-soluble polyphosphate selected from the group consisting of ammoniated polyphosphoric acids; molasses; and a colloidal dispersion of starch granules, the ratio of the weight of the polyphosphate to the weight of starch being between about 0.2 and about 2.0, and the sum of the weight of the polyphosphate and the weight of the starch constituting between about 2% and about 10% of the total weight of the aqueous ruminant feed composition, said weight of polyphosphate being expressed in terms of phosphorus pentoxide; said colloidal dispersion of starch granules being derived from a plant starch by agitating the plant starch in aqueous urea, said plant starch being selected from the group consisting of potato starch, corn starch, wheat starch and rice starch; and said molasses being admixed in amount between 5% and 30% by weight of the aqueous suspension ruminant feed composition, whereby there is produced an aqueous suspension ruminant feed composition characterized by remaining in suspension form for a least two weeks.

References Cited

UNITED STATES PATENTS

| | | | |
|---|---|---|---|
| 3,325,289 | 6/1967 | Lyons | 99—6 |
| 3,420,672 | 1/1969 | Appleman | 99—2 |
| 3,523,798 | 8/1970 | Kail | 99—2 |
| 3,234,005 | 2/1966 | Smalter et al. | 71—29 |
| 3,519,413 | 7/1970 | Trimbach et al. | 71—64 |
| 3,538,215 | 11/1970 | Snyder et al. | 99—2 |
| 3,512,986 | 5/1970 | Snyder et al. | 99—2 |

OTHER REFERENCES

Webster's New World Dictionary, Second College Edition, p. 459.

NORMAN YUDKOFF, Primary Examiner

C. P. RIBANDO, Assistant Examiner

U.S. Cl. X.R.

99—6